(12) United States Patent
Pratt et al.

(10) Patent No.: US 8,380,145 B2
(45) Date of Patent: Feb. 19, 2013

(54) INTEGRATED CIRCUIT, WIRELESS COMMUNICATION UNIT AND METHOD FOR QUADRATURE POWER DETECTION

(75) Inventors: Patrick Pratt, Cork (IE); Bernard Mark Tenbroek, West Malling (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 93 days.

(21) Appl. No.: 13/156,313

(22) Filed: Jun. 8, 2011

(65) Prior Publication Data

US 2012/0314784 A1    Dec. 13, 2012

(51) Int. Cl.
*H01Q 11/12*    (2006.01)
*H04B 1/04*    (2006.01)

(52) U.S. Cl. .............. 455/127.2; 455/126; 455/522; 375/297

(58) Field of Classification Search ........... 455/67.11, 455/115.1, 126, 127.2, 522; 375/297
See application file for complete search history.

(56) References Cited

U.S. PATENT DOCUMENTS

| | | | |
|---|---|---|---|
| 6,674,998 B2 * | 1/2004 | Prentice | 455/115.1 |
| 8,160,191 B2 * | 4/2012 | Row et al. | 375/296 |
| 2009/0196223 A1 | 8/2009 | Nalbantis | |
| 2009/0258640 A1 | 10/2009 | Persson | |

* cited by examiner

*Primary Examiner* — Quochien B Vuong
(74) *Attorney, Agent, or Firm* — Winston Hsu; Scott Margo

(57) ABSTRACT

An integrated circuit for a wireless communication unit has a transmit power control system employing a quadrature (I/Q) based power detector having at least one reference path and at least one detector path. The integrated circuit includes: a first quadrature error determination module for determining a quadrature error of a transmit signal and a second quadrature error determination module for determining a quadrature error of a detector signal input to the at least one detector path; a first quadrature balancing module arranged to correct for quadrature error of the transmit signal and output a reference signal to the at least one reference path; a second quadrature balancing module arranged to correct for quadrature error of the reference signal input to the at least one reference path, and a third quadrature balancing module arranged to correct for quadrature error of the detector signal input from the at least one detector path.

15 Claims, 9 Drawing Sheets

INTEGRATED CIRCUIT, WIRELESS COMMUNICATION UNIT AND METHOD FOR QUADRATURE POWER DETECTION

FIELD OF THE INVENTION

The field of this invention relates to an integrated circuit, a wireless communication unit and method for quadrature power detection. The invention is applicable to, but not limited to, an integrated circuit and a wireless communication unit comprising a quadrature power detector for use with a power control loop.

BACKGROUND OF THE INVENTION

In the field of wireless communication systems, power control is needed in a radio access network to allow the transceivers in a base station (referred to as a Node-B in a $3^{rd}$ generation partnership project (3GPP™) communication standard within the universal mobile telecommunication system (UMTS™)) and the transceivers in a subscriber wireless communication unit (referred to as a user equipment (UE) in a $3^{rd}$ generation partnership project communication standard) to adjust their transmitter output power level to take into account the geographical distance between them. The closer that the subscriber wireless communication unit (UE) is to the base station's (e.g. Node B's) transceiver, the less power the UE and the Node B's transceivers are required to transmit, for the transmitted signal to be adequately received by the other communication unit. Such a transmit 'power control' feature saves battery power in the UE and also helps to reduce the level of potential interference within the communication system. Initial power settings for the UE, along with other control information, are typically set by the information provided on a beacon physical channel in each particular communication cell.

Transmit power control systems that employ quadrature (I/Q) based power detectors, such as the transmit power control system 100 of FIG. 1A, can suffer from degraded accuracy due to a presence of quadrature imbalance in either the transmit (Tx) path and/or a feedback detector path. The transmit power control system 100 of FIG. 1A comprises a digital baseband integrated circuit (DBB) 105 comprising a root raised cosine (RRC) filter 110 designed to extract quadrature I/Q symbols from a wideband code division multiple access (WCDMA) signal input thereto. The extracted quadrature I/Q symbols are input to a reference quadrature balancing block 115, which provides reference quadrature balanced symbols 135 to a transmitter (TX) 120. The transmitter 120 is coupled to a gain estimation block 125 comprising a quadrature detector 130 and a reference path that also receives a representation of the pre-transmitter reference quadrature balanced symbols 135. The quadrature detector 130 is in, or coupled to, a feedback path that receives a portion of the transmit power amplifier output via, say, a directional coupler. The quadrature detector 130 and reference path both comprise anti-aliasing baseband low-pass filters 126, 127 to remove any out-of-band components (which may include all unwanted signals such as images, distortion products, noise, etc.) that may arise. The low pass filters 126, 127 provide filtered quadrature signals to an analogue multiplexer 140 that selects either: a reference I/Q signal, or a detected I/Q signal to pass through to an analogue-to-digital convertor (ADC) 145. The I/Q signals input to the ADC 145 are converted into digital form, and the digital form is filtered in adjacent channel interference (ACI) filter 150 to again remove unwanted components. In some known implementations, the analogue multiplexer 140 may be replaced with duplicate ADCs 145 and ACI filters 150.

The filtered digital representation is then input to a gain estimation algorithm 155, which calculates a gain value 160 to apply to the transmit amplifier gain chain. This gain estimate is used to correct the gain in the transmitter 120 in terms of the transmit power control (TPC) loop, for example to set the desired transmit output power. In essence, a TPC loop to accurately set an output power of the power amplifier may be considered as follows. The baseband or reference power level is typically known, as it is set by the design and varies with different uplink data rates within the $3^{rd}$ generation partnership project (3GPP) of communication standards, more than one transport channel may be used, where a combination of Transport Formats (TFs) for all transport channels form a Transport Format Combination (TFC) that are identified in a Transport Format Combination Indicator (TFCI).

A typical value for the baseband or reference power level may be, for example, −6 dBm. Thus if we want the output power of the power amplifier to be, say, 24 dBm a gain of 24−−6=30 dB between the baseband and the antenna is required. If the gain between the baseband and the antenna is measured at, say, 29 dB, an extra 1 dB gain is required. Typically there will be a number of gain blocks along the transmit path that can be adjusted to realise the required gain adjustment. Ultimately, the accuracy of the TPC or power correction block reduces to the accuracy of this gain estimation. If there is an error in the gain estimation (or measurement), then this error will be transferred onto the accuracy of the output power, i.e. an xdB error in estimating the gain will translate into an xdB error of the output power. The gain estimation of gain estimation algorithm 155 is typically specified to have an accuracy of, say, better than +/−0.05 dB, whereas an accuracy of +/−0.2 dB for the calculated gain value 160 would be realistic.

An underlying problem that the present invention aims to solve relates to the fact that any quadrature imbalance along the reference transmit path and/or detector path can dominate the 0.05 dB gain estimation error budget, to such a degree that quadrature correction or balancing is required. The transmit quadrature imbalance may be corrected by the reference quadrature balancing block 115, such that any residual imbalance along the transmit path would result in the required image rejection. Therefore as far as the transmit signal and transmitter is concerned, image rejection is not an issue. However, the TPC reference signal 135 is tapped off after the TX quad correction step, and, hence, has phase and gain imbalance 'inadvertently' inserted into it by virtue of the transmit quadrature correction step, 115.

The use of a direct-conversion signal chain from the transmitter RF output down to a baseband signal in the feedback detector path provides a low-cost receiver solution for power control in third generation (3G) and fourth generation (4G) communication units. It is a less complex architecture than other receivers, not requiring the multiple surface-acoustic wave (SAW) and discrete filters used in a real intermediate frequency (IF) sampling architecture. The baseband channel filter in a direct conversion receiver is typically an integrated or discrete low-pass design that provides both out-of-band blocking and broadband noise rejection before digitization. It can be designed with much lower insertion loss and cost than the IF filters used in super-heterodyne or real IF sampling architectures. With an I/Q demodulator, the baseband cut-off frequency need only to be one-half of the total signal bandwidth for a complex modulated signal centred at 0 Hz. Despite these advantages, direct conversion radio design does not come without difficulty. For example, and in particular, any gain or phase imbalance on the 'I' and 'Q' paths, or producing a non-exact 90-deg. phase shift of the demodulator circuit, will result in energy at the unwanted sideband frequency.

Furthermore, in some power control systems, due to intentional transmit quadrature correction, an instantaneous amplitude and/or phase error is introduced to the power detector reference, as illustrated in graph 170 of FIG. 1B. Here, the ideal reference (including the intentional quadrature (I/Q) transmit path correction), is shown by line 174, and with reference correction of the transmit path quadrature imbalance 176 (undoing the transmit path quadrature error) added. The resultant signal comprises an instantaneous gain error (i.e. amplitude and phase) due to quadrature imbalance, as shown by line 172 (noting that any instantaneous phase error is irrelevant in this case as we are ultimately only concerned with (i.e. amplitude modulation (AM)) error gain. The severity of the quadrature imbalance problem depends upon the operational condition/statistics of the transmit data/channel. Over a finite (average) period of time, this instantaneous amplitude error leads to a degradation in the standard deviation accuracy of the detector, as illustrated by quadrature imbalance plot 186 in graph 180 of FIG. 1C, which shows a plot of standard deviation 182 versus detector power 184. The impact of the instantaneous amplitude error becomes more critical as the averaging time for the power estimation calculation is reduced. The problem may be further compounded due to a presence of any unknown transmit phase offset in the transmit path, as it is extremely complicated to correct for any such quadrature imbalance in both the transmit path and the feedback detector path.

It is known that the 3GPP™ standards impose very strict performance requirements on the TPC operation of communication units conforming to the 3GPP™ standards. In particular, the 3GPP™ standard specifies two forms of TPC, namely: open loop power control and inner loop power control. Open loop power control is an ability of the UE transmitter to set its output power to a specific value. It is used for setting initial uplink and downlink transmission powers when a UE is accessing the network. In 3GPP™, the open loop power control tolerance is ±9 dB (normal conditions) or ±12 dB (extreme conditions). Inner loop power control (also called fast closed loop power control) in the uplink is the ability of the UE transmitter to adjust its output power in accordance with one or more TPC command(s) (TPC_cmd) that is/are received in the downlink, in order to keep the received uplink signal-to-interference ratio (SIR) at a given SIR target. The UE transmitter is capable of changing the output power with a step size of 1, 2 and 3 dB, in the slot immediately after the slot where the TPC_cmd can be derived.

As recent communication trends have necessarily been supporting ever-increasing broadband data rates, it is also known that certain high data rate channels are more sensitive to this problem, such that the accuracy of quadrature based power detectors is sometimes compromised in high speed data channels due to any quadrature imbalance.

US 2009/0196223 A1 discloses an example of a known transmit power controller that comprises a power detector that is based on quadrature detection, followed by a digital root mean square (rms) average calculation. This system is ideally suited to release 99 or voice channels of the third generation (3G) universal mobile telecommunication standard (UMTS™). However, the transmit power controller proposed in US 2009/0196223 A1 discloses an example that is inadequate for the higher data rate channels that are now supported in the high speed uplink packet access (HSUPA) of the $3^{rd}$ generation partnership project (3GPP™) extension of UMTS™. In particular, US 2009/0196223 A1 fails to mention or disclose any mechanism to solve the problem arising from transmit calibration quadrature and detector imbalance. US 2009/0258640 A1 is a further example of a known transmit power controller that utilizes a quadrature based power detector and neither recognises nor offers a solution to the problem associated with quadrature imbalance.

SUMMARY OF THE INVENTION

Accordingly, the invention seeks to mitigate, alleviate or eliminate one or more of the above mentioned disadvantages singly or in any combination. Aspects of the invention provide an integrated circuit, a communication unit comprising a quadrature power detector, and a method for quadrature power detection, as described in the appended claims.

According to a first aspect of the invention, there is provided an integrated circuit for a wireless communication unit comprising a transmit power control system that employs a quadrature (I/Q) based power detector having at least one reference path and at least one detector path. The integrated circuit comprises a first quadrature error determination module for determining a quadrature error of a transmit signal and a second quadrature error determination module for determining a quadrature error of a detector signal input to the at least one detector path. The integrated circuit further comprises a first quadrature balancing module operably coupled to the first quadrature error determination module and arranged to correct for quadrature error of the transmit signal and output a reference signal to the at least one reference path. The integrated circuit further comprises a second quadrature balancing module operably coupled to the first quadrature error determination module and arranged to correct for quadrature error of the reference signal input to the at least one reference path and a third quadrature balancing module operably coupled to the second quadrature error determination module and arranged to correct for quadrature error of the detector signal input from the at least one detector path.

Thus, in one example embodiment of the invention, the quadrature imbalance of the transmit and detector paths may be corrected, such that the accuracy of quadrature based power detectors is not compromised in high speed data channels. In particular, any quadrature error introduced by the first quadrature balancing module may be (inversely) corrected by the second quadrature balancing module. In one example embodiment of the invention, the quadrature imbalance of the at least one transmit (reference) path and the at least one detector path may be corrected separately and independently, such that the accuracy of quadrature based power detectors may not be compromised in high speed data channels.

According to an optional feature of the invention, the integrated circuit may comprise a power detector comprising, or operably coupled to, the first quadrature error determination module and the second quadrature error determination module, and arranged to calibrate transmitter quadrature errors of the wireless communication unit. The second quadrature balancing module may be located in the at least one reference path and located separate from the third quadrature balancing module, which may be located in the at least one detector path.

According to an optional feature of the invention, a phase error of the transmit signal that is input to the at least one reference path and/or a phase error of the detector signal input to the at least one detector path may be random, such that the second quadrature balancing module and the third quadrature balancing module comprise independent correction modules.

Thus, in this optional example embodiment of the invention, the quadrature imbalance of any random phase rotation or phase shift exhibited in either the transmit or detector paths may be corrected separately and independently, such that the accuracy of quadrature based power detectors is not compromised in high speed data channels.

According to an optional feature of the invention, the at least one quadrature balancing module may be arranged to correct for a phase rotation between the at least one reference path and the at least one detector path.

According to an optional feature of the invention, the third quadrature balancing module may comprise a gain register arranged to provide a gain error correction parameter ($\epsilon_{DX}$) for generating a detector quadrature correction value.

According to an optional feature of the invention, a phase error of the transmit signal between the at least one reference path and the at least one detector path may be at least one from a group consisting of: zero, known, deterministic.

According to an optional feature of the invention, the integrated circuit may comprise a tone generator for generating a tone to input to a power amplifier to facilitate quadrature calibration.

According to an optional feature of the invention, the integrated circuit may further comprise a feedback circuit that comprises the first quadrature error determination module and the transmit signal may be an amplified representation of the tone received from the power amplifier via the at least one reference path.

According to an optional feature of the invention, the feedback circuit may comprise the second quadrature error determination module coupled to at least one detector feedback path such that the second quadrature error determination module receives a representation of the tone from the tone generator via the at least one detector feedback path.

According to an optional feature of the invention, the integrated circuit may further comprise a calibration or correction module arranged to perform a calculation of correction/calibration coefficients to correct for at least one of quadrature error of the reference signal input to the at least one reference path and quadrature error of the detector signal input from the at least one detector path.

According to a second aspect of the invention, there is provided a wireless communication unit comprising a transmit power control system that employs a quadrature (I/Q) based power detector having at least one reference path and at least one detector path. The wireless communication unit comprises a first quadrature error determination module for determining a quadrature error of a transmit signal and a second quadrature error determination module for determining a quadrature error of a detector signal input to the at least one detector path. The integrated circuit further comprises a first quadrature balancing module operably coupled to the first quadrature error determination module and arranged to correct for quadrature error of the transmit signal and output a reference signal to the at least one reference path. The integrated circuit further comprises a second quadrature balancing module operably coupled to the first quadrature error determination module and arranged to correct for quadrature error of the reference signal input to the at least one reference path and a third quadrature balancing module operably coupled to the second quadrature error determination module and arranged to correct for quadrature error of the detector signal input from the at least one detector path.

According to a third aspect of the invention, there is provided a method for a transmit power control system that employs a quadrature (I/Q) based power detector having at least one reference path and at least one detector path. The method comprises determining a quadrature error of a transmit signal; quadrature balancing the transmit signal; and outputting a reference signal to the at least one reference path. The method further comprises determining a quadrature error of a detector signal input to the at least one detector path; and quadrature balancing the detector signal input from the at least one detector path. In some examples, the quadrature balancing is made in response to the respective determination of the quadrature error of the respective transmit signal or detector signal.

According to a fourth aspect of the invention, there is provided a non-transitory computer program product comprising executable program code stored therein and operable for performing the method of the third aspect of the invention.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 1A:
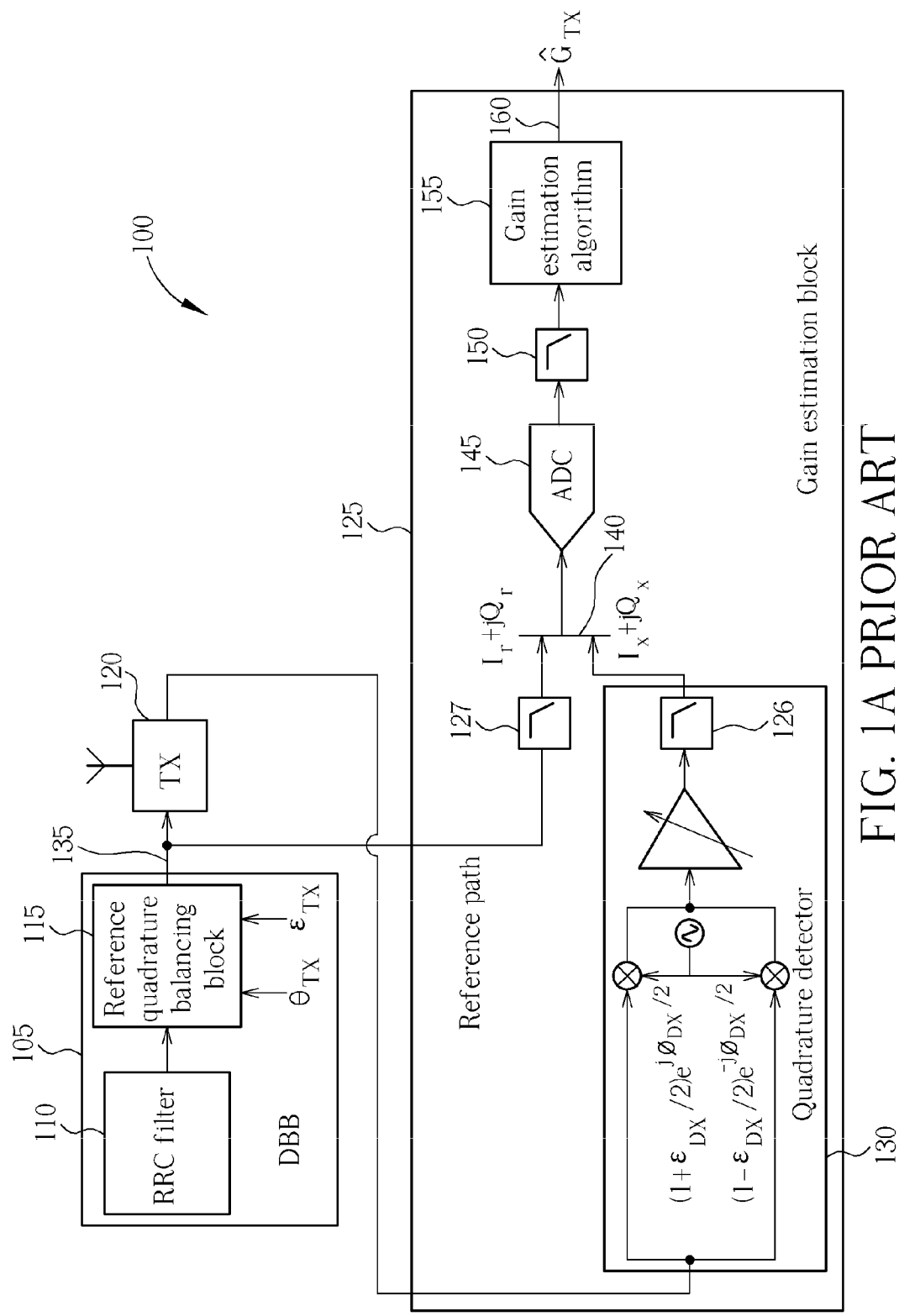
FIG. 1A illustrate a known transmit power control system.

Examples of the present invention will now be described with reference to examples of integrated circuits (ICs) and wireless communication unit architectures. However, in other examples, the present invention may not be limited to the specific integrated circuits and wireless communication unit architectures herein described with reference to the accompanying drawings, and may equally be applied to alternative ICs and architectures. Additionally, because the illustrated example embodiments of the present invention may, for the most part, be implemented using electronic components and circuits known to those skilled in the art, details will not be described in any greater detail than that considered necessary as illustrated below, for the understanding and appreciation of the underlying concepts of the present invention and in order not to complicate or distract from the teachings of the present invention.

Example embodiments of the invention provide an integrated circuit for a wireless communication unit comprising a transmit power control system that employs a quadrature (I/Q) based power detector having at least one reference path and at least one detector path. The accuracy of the power control function in the wireless communication unit may be improved by including such quadrature (I/Q) based power detector and quadrature correction.

The integrated circuit comprises a first quadrature error determination module for determining a quadrature error of a transmit signal and a second quadrature error determination module for determining a quadrature error of a detector signal input to the at least one detector path. The integrated circuit further comprises a first quadrature balancing module operably coupled to the first quadrature error determination module and arranged to correct for quadrature error of the transmit signal and output a reference signal to the at least one reference path. The integrated circuit further comprises a second quadrature balancing module operably coupled to the first quadrature error determination module and arranged to correct for quadrature error of the reference signal input to the at least one reference path; and a third quadrature balancing module operably coupled to the second quadrature error determination module and arranged to correct for quadrature error of the detector signal input from the at least one detector path. In this manner, the second quadrature balancing module may be individually and independently arranged to quadrature balance quadrature errors introduced by the first quadrature balancing module in response to the determination of the quadrature error of the transmit signal input to the at least one reference path.

By separating the quadrature balancing modules to individually quadrature balance the transmit signal input to the at least one reference path and quadrature balance the transmit signal input to the detector path, any phase rotation or phase offset that is introduced into the reference (transmit)-detector path between the first (e.g. reference (transmit)) quadrature error determination module and the second (e.g. detector) quadrature error determination module may be taken into account.

Figure 2:
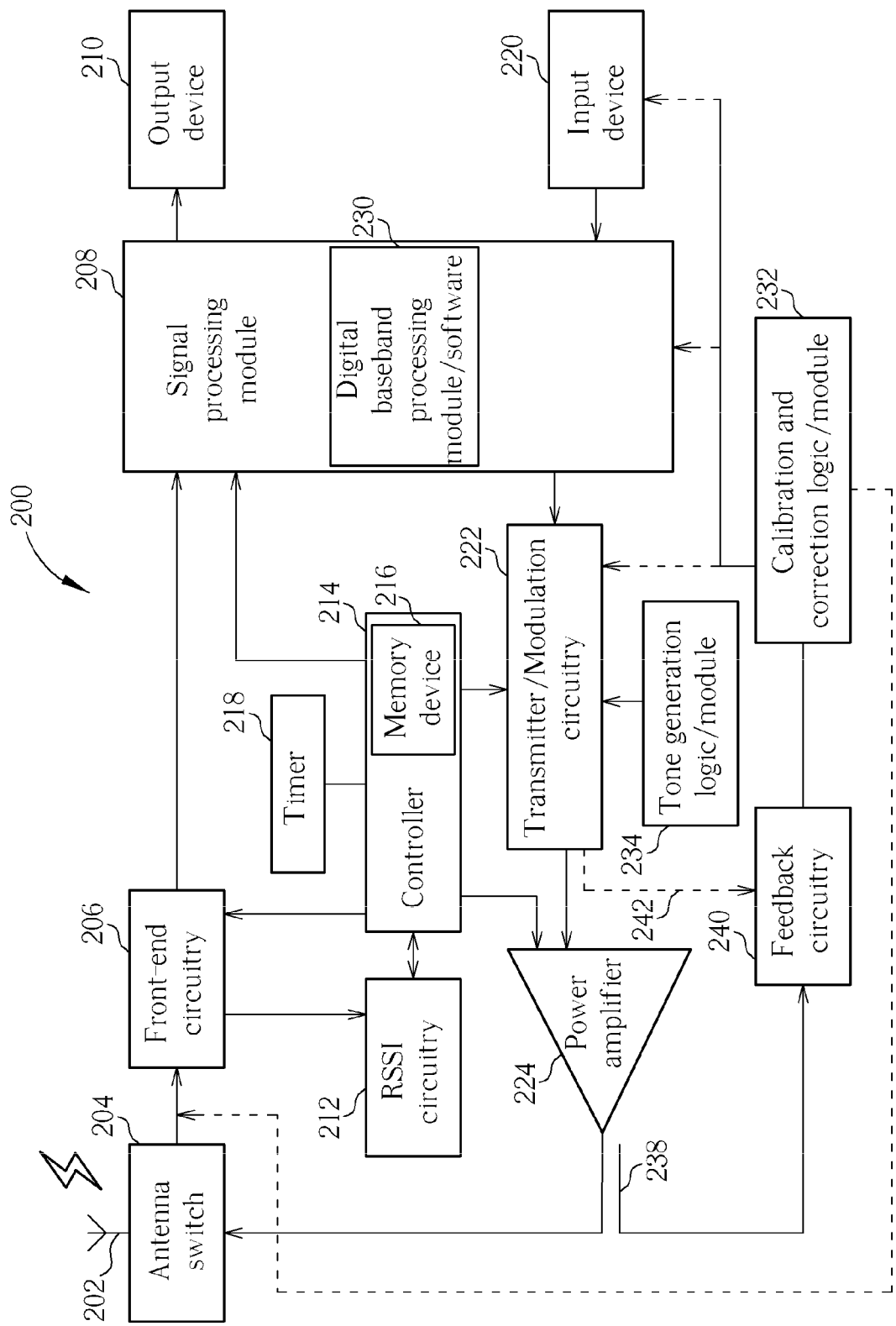
FIG. 2 illustrates an example of a wireless communication unit that may be adapted to implement example embodiments of the invention.

Referring first to FIG. 2, a block diagram of a wireless subscriber communication unit (sometimes referred to as a mobile subscriber unit (MS) in the context of cellular communications or an user equipment (UE) in terms of a $3^{rd}$ generation partnership project (3GPP) communication system) is shown, in accordance with a preferred embodiment of the invention. Although, the example embodiments are described in reference to a UE, it is envisaged that the example embodiments may be equally applied to any other device or communication unit that requires or employs transmit power control. The wireless subscriber communication unit 200 contains an antenna 202 preferably coupled to a duplex filter or antenna switch 204 that provides isolation between receive and transmit chains within the wireless subscriber communication unit 200. A skilled artisan appreciates that a similar circuit design exists in other wireless communication units, such as a base station or NodeB.

The receiver chain, as known in the art, includes receiver front-end circuitry 206 (effectively providing reception, filtering and intermediate or base-band frequency conversion). The front-end circuitry 206 is serially coupled to a signal processing module 208. An output from the signal processing module 208 is provided to a suitable output device 210, such as a screen or flat panel display. The receiver chain also includes received signal strength indicator (RSSI) circuitry 212, which in turn is coupled to a controller 214 that maintains overall subscriber unit control. The controller 214 may therefore receive bit error rate (BER) or frame error rate (FER) or signal-to-noise (SNR) or similar 'signal quality' data from recovered information. The controller 214 is also coupled to the receiver front-end circuitry 206 and the signal processing module 208 (generally realised by a digital signal processor (DSP)). The controller 214 is also coupled to a memory device 216 that selectively stores operating regimes, such as decoding/encoding functions, synchronisation patterns, code sequences, RSSI data and the like.

In one example embodiment, signal processing module 208 comprises a digital baseband processing module (or software) 230, which comprises a transmit power control (TPC) algorithm. In one example, a gain estimation is fed back to the digital baseband processing module (or software) 230 to facilitate embodiments of the invention.

In accordance with examples of the invention, the memory device 216 stores quadrature error correction information, as required by the communication unit 200 and used by signal processing module 208. Furthermore, a timer 218 is operably coupled to the controller 214 in order to control the timing of operations (transmission or reception of time-dependent signals) within the wireless subscriber communication unit 200.

As regards the transmit chain, this essentially includes an input device 220, such as a keypad, coupled in series through transmitter/modulation circuitry 222 and a power amplifier 224 to the antenna 202. The transmitter/modulation circuitry 222 and the power amplifier 224 are operationally responsive to the controller 214 of the wireless subscriber communication unit 200. In a majority of wireless communication units, such as wireless subscriber communication unit 200, where power control of the transmit signal is implemented, a mechanism for monitoring and thereafter adapting the transmit signal power is provided through use of a feedback path. In the illustrated example, this is achieved via coupler 238 and feedback circuitry 240 that, in combination, feeds back a portion of the transmit signal applied to the antenna 202 and process the fed back transmit signal to enable a suitable modification/adjustment of the transmit signal in the forward path to be effected.

In effect, in one example embodiment, the feedback circuitry 240 comprises, or is configured to operate as, a quadrature power detector that has been modified or additionally configured to calibrate transmitter quadrature errors.

The feedback circuitry 240 may be configured to determine a phase and/or gain of the signal being transmitted. In one example embodiment, a tone generation logic/module 234 may be configured to inject a tone or signal, such as a complex tone, into the transmit path (or alternatively, in other examples, a radio frequency tone into the receive path) from which the quadrature imbalance can be calculated and the balance correction value derived, as would be understood to those skilled in the art. In one example embodiment, a dedicated on-chip RF or baseband tone generator may be used for this purpose.

As shown in FIG. 2, the feedback circuitry 240 uses a first detector path via coupler 238 for quadrature calibration by detecting the inserted tone or signal and outputs the determined phase and/or gain of the signal being transmitted to calibration and correction logic/module 232 that is arranged to perform a calculation of the correction/calibration coefficients and in response thereto compensate for the measured phase/amplitude changes that are caused at various instances of the transmitter chain and fed back via feedback circuitry 240. In example embodiments a second detector feedback path 242 is added from the output of transmitter/modulation circuitry 222 to the input of the feedback circuitry 240 to facilitate quadrature calibration and correction of the transmit path and/or detector path. In one example embodiment, a dedicated on-chip RF or baseband calibration and correction logic/module 232 may be used for this purpose.

Alternatively, in other examples, the calibration and correction logic/module 232 may be located elsewhere in the wireless subscribe communication unit 200 in order to receive the processed fed back power information from the feedback circuitry 240, such as transmitter/modulation circuitry 222 and/or signal processing module 208 and/or the input device 220 thereby signifying that the reference signal is used as an input for the balancing operation.

In other examples, other calibration and correction logic/modules can be used to correct for quadrature errors as determined using the concepts described herein. In other examples, a separate calibration system, external to the signal processing module 208, may be employed for this purpose.

The signal processing module 208 in the transmit chain may be implemented as distinct from the processor in the receive chain. Alternatively, a single processor 208 may be used to implement processing of both transmit and receive signals, as shown in FIG. 2. Clearly, the various components within the wireless subscribe communication unit 200 can be realised in discrete or integrated component form, with an ultimate structure therefore being merely an application-specific or design selection.

Wireless communication units, such as wireless subscribe communication unit 200, that require precise transmit power control loops typically rely on a mechanism for detecting an average transmit power or equivalently making an estimation of the gain along the transmit path. However, as noted in the background section, known power detectors that employ a quadrature receiver will incur degraded accuracy due to a presence of quadrature imbalance along the transmit (reference) and detector paths. As identified by the inventors, the reference path quadrature (I/Q) imbalance may arise from an application of transmit I/Q calibration. A calibration step is often advantageous to ensure that the transmit quadrature signals are compliant with the required specifications of the relevant communication standard. However, the calibration step inadvertently degrades the accuracy of the power detector measurement and, thus, a quadrature error of the transmit signal path may show up in the reference path due to such calibration.

As also identified by the inventors, a detector imbalance may arise from gain and phase imbalance incurred in the detector quadrature mixer.

Figure 3:
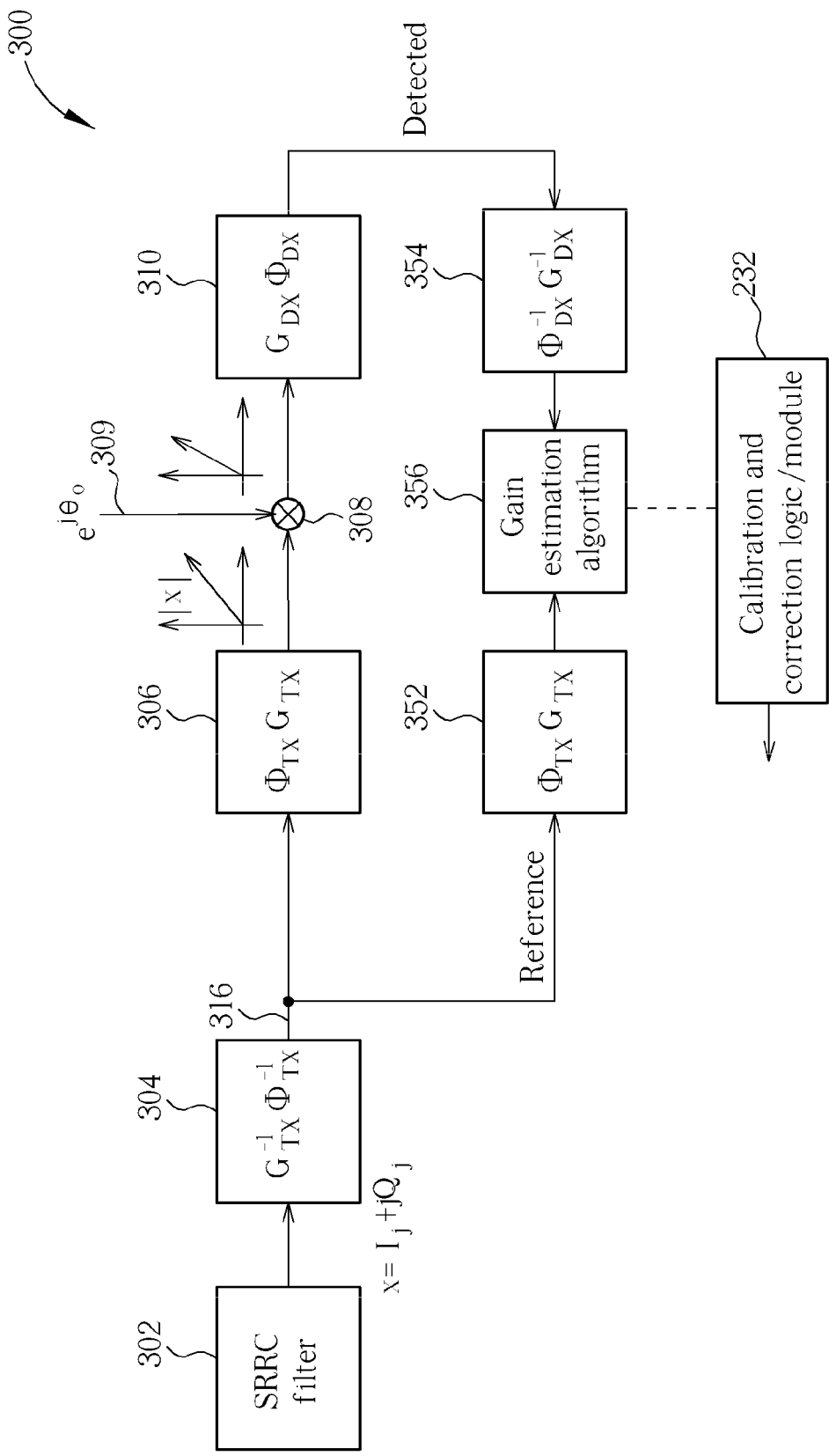
FIG. 3 illustrates an example transmit power control system architecture in accordance with one example embodiment of the invention.
Figure 4:
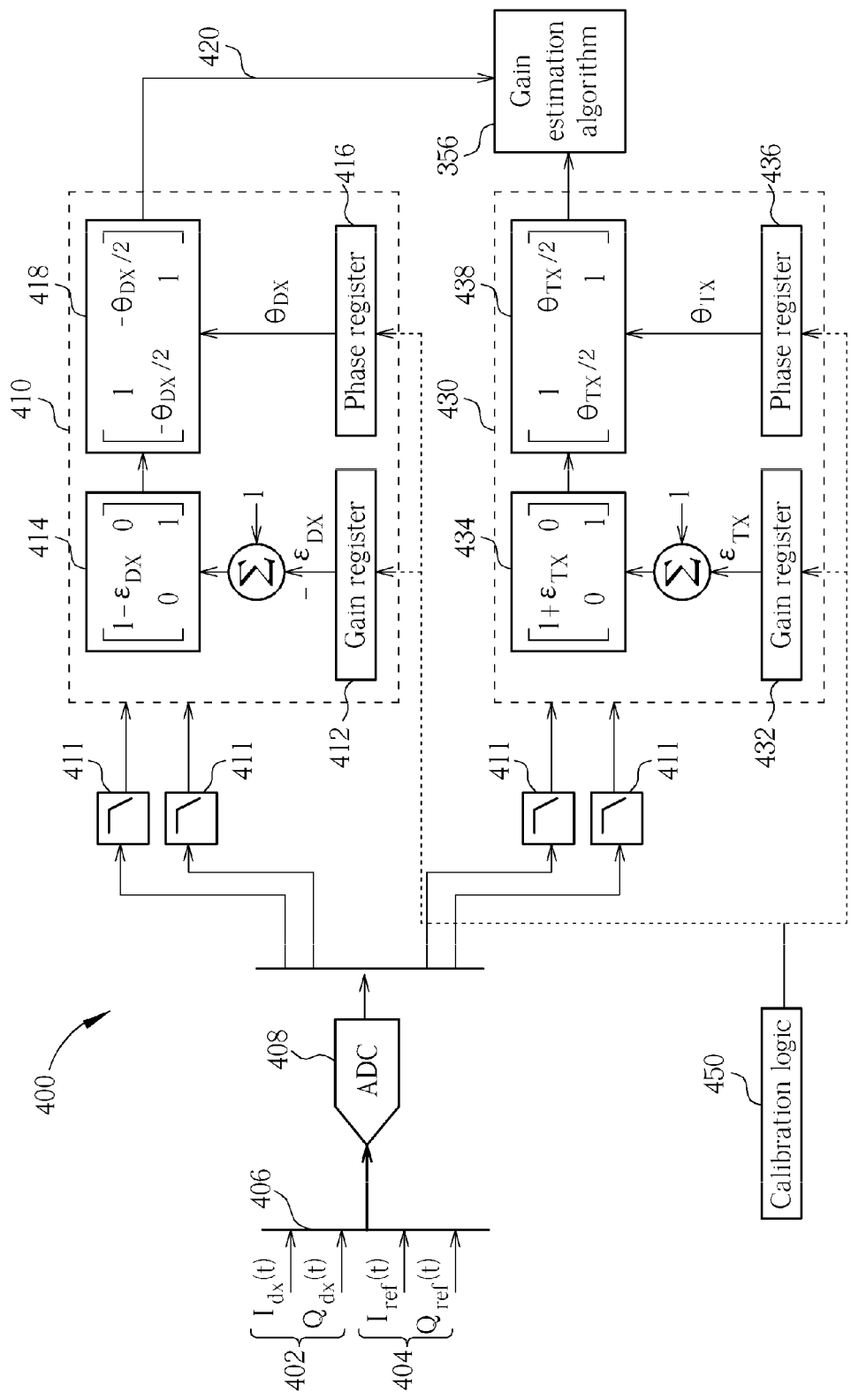
FIG. 4 illustrates a more detailed representation of a detector quadrature error correction arrangement in accordance with an enhanced example embodiment of the invention.

Therefore, in accordance with examples of the invention, the feedback circuitry 240, together with, and in some examples under the control and guidance of, the signal processing module 208, memory device 216, timer 218 and/or controller 214 have been adapted to comprise two independent quadrature balancing systems; a first quadrature balancing function or module or system or circuit to correct for an intentional/calibration balancing of the reference path and a second quadrature balancing function or module or system or circuit to correct for any quadrature imbalance along the detector path, as further described with reference to FIG. 3 and more particularly with respect to FIG. 4.

FIG. 3 illustrates a simplified example of an integrated circuit 300 comprising a transmit power control system architecture, and particularly illustrates potential sources of quadrature imbalance in such a transmit power control system. In particular, the quadrature correction operation is by separated into two independent stages, namely a reference correction stage and a detector correction stage, whereby the impact of any phase offset can be substantially avoided. Thus, in examples, the reference path may be corrected independently from the correction of the detection path, for example when the phase offset along the transmit path is not zero.

The transmit block in FIG. 3 comprises square root raised cosine (SRRC) filter 302, transmit quadrature correction function/module 304, reference (transmit) quadrature error determination function/module 306 and transmit path 309.

In this example, FIG. 3 comprises filtered quadrature (I/Q) wideband CDMA symbols being output from the SRRC filter 302 and input to a transmit quadrature correction function/module 304. The transmit quadrature correction function/module 304 provides amplitude and phase error correction on the filtered quadrature (I/Q) wideband CDMA symbols to produce a reference (transmit) signal 316. The transmit quadrature correction function/module 304 corrects the quadrature along the transmit path up to the antenna. This ensures transmit signal integrity by ensuring images are maintained below a specified limit and thereby guaranteeing that the transmitter is balanced to a given accuracy. This is a separate requirement to transmit power control and gain estimation accuracy.

The actual reference (transmit) quadrature error and the quadrature correction determined purely from the reference (transmit) quadrature error is applied to the reference (transmit) signal in reference (transmit) correction function/module 352. The actual transmit signal after being subject to transmit path errors is passed to the detector path. Thus, function 310 in FIG. 3 represents the actual detector path quadrature error. In this instance, the phase offset/rotation introduced in transmit mixer 308 by the random phase offset at point 309 along the transmit-detector path is separately taken into account. The determined amplitude and phase of the reference (transmit) quadrature error are used by the detector quadrature error correction function/module 354 to correct for any gain or phase errors of the reference (transmit) signal on the detector path. Both outputs from the reference (transmit) correction function/module 352 and the detector quadrature error correction function 354 are each respectively input to gain estimation algorithm 356.

In effect, the gain estimation algorithm 354 combines the transmit I/Q correction gain of reference $(1+\epsilon)$ with the detector I/Q gain error, $(1+\epsilon_{DX}/2)(1-\epsilon_{DX}/2)$, to provide a 0 dB gain imbalance between reference and measured vectors. The determined phase and/or gain of the signal being transmitted output from the gain estimation algorithm 354 is input to calibration and correction logic/module 232 that is arranged to compensate for the measured phase/amplitude changes that are caused at various instances of the transmitter chain.

In this manner, the phase rotation or phase offset introduced by the reference (transmit) quadrature error determination function/module 306, or any phase rotation or phase offset introduced into the reference transmit-detector path between the reference (transmit) quadrature error determination function/module 306 and the detector quadrature error determination function/module 310 may be taken into account separately in the detector quadrature error correction function/module 354.

In one example of a transmit power control system architecture 300, when the phase error (or phase rotation at point 308) is either, zero, known or deterministic, it may be possible to combine the quadrature balancing logic modules into one (single step) error correction function/module (not shown). Thus, if the phase offset along the transmit path 309 is zero or removed by another calibration system, then a combined quadrature correction block may be sufficient to correct for any underlying quadrature imbalance problem.

However, in a scenario where the phase error along the transmit path 309 was not zero or known or deterministic, e.g. where the phase error/offset is essentially random, it is advantageous to have two independent correction blocks, as shown in FIG. 3 and FIG. 4. For example, such an unknown phase rotation at point 308, may represent, say, a phase offset incurred in the up converter and/or in the initial power-on of the power amplifier (PA), and thus represents the combined offset as the signal propagates through the RF blocks of the transmitter. Consequently, a presence of a random phase offset along the transmit-detector path, introduced at, say, point 308, will result in the quadrature correction steps of the reference and detected path producing different instantaneous amplitude modulated (AM) quadrature error terms. As a consequence, the proposed separate balancing methodology using two independent stages of a reference correction and a detector correction may precisely adjust the error correction phase. Therefore, the example illustrated in FIG. 3 proposes a mechanism to separate, process and individually apply quadrature correction to each of the transmit (reference) path and detector quadrature path. Thus, the reference signal path is corrected independently from any signal correction in the detector path. By separating the correction step into two independent stages, the impact of any potential phase offset can be avoided.

Figure 1B:
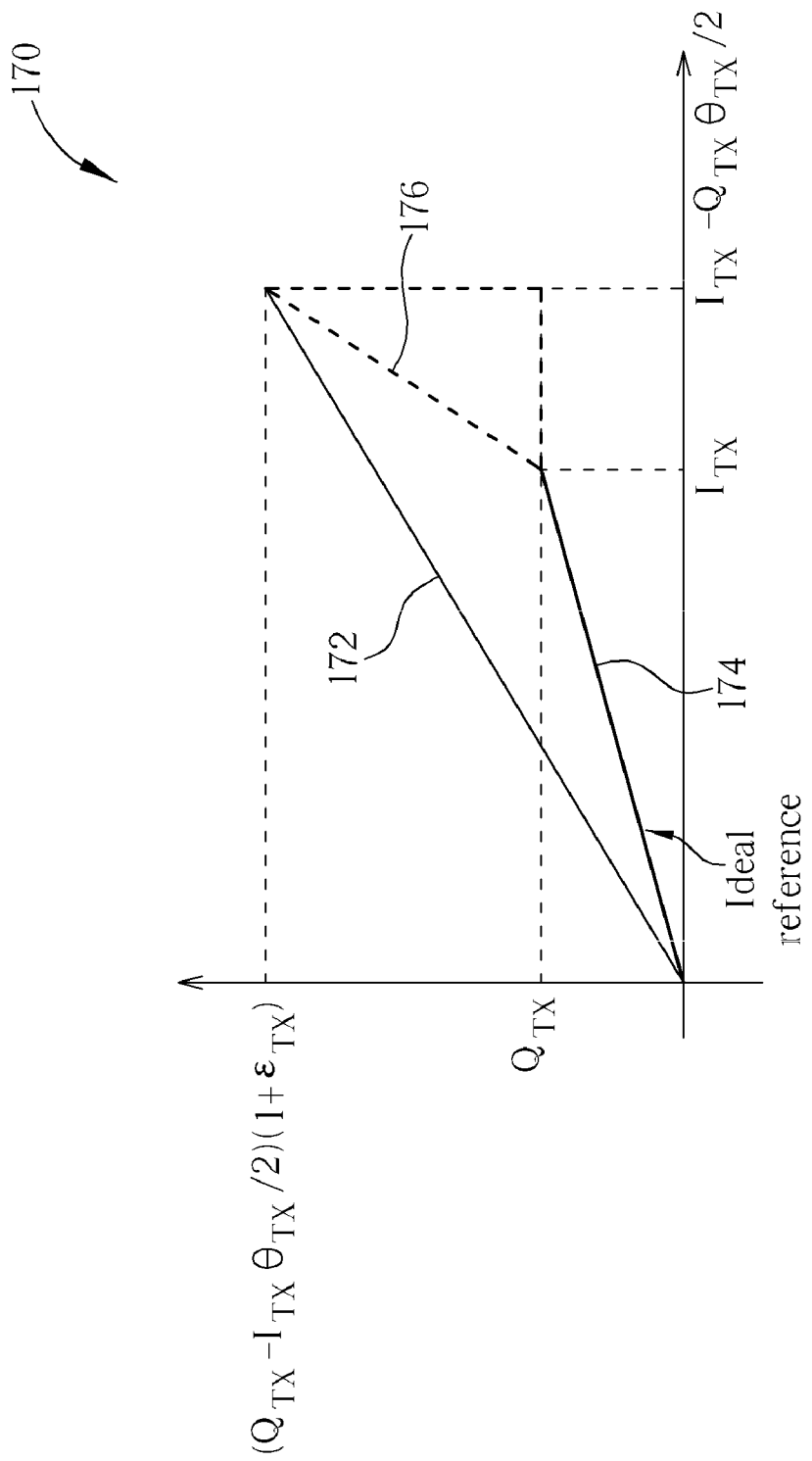
FIG. 1B illustrates an instantaneous amplitude and/or phase error that is introduced to the power detector reference.
Figure 1C:
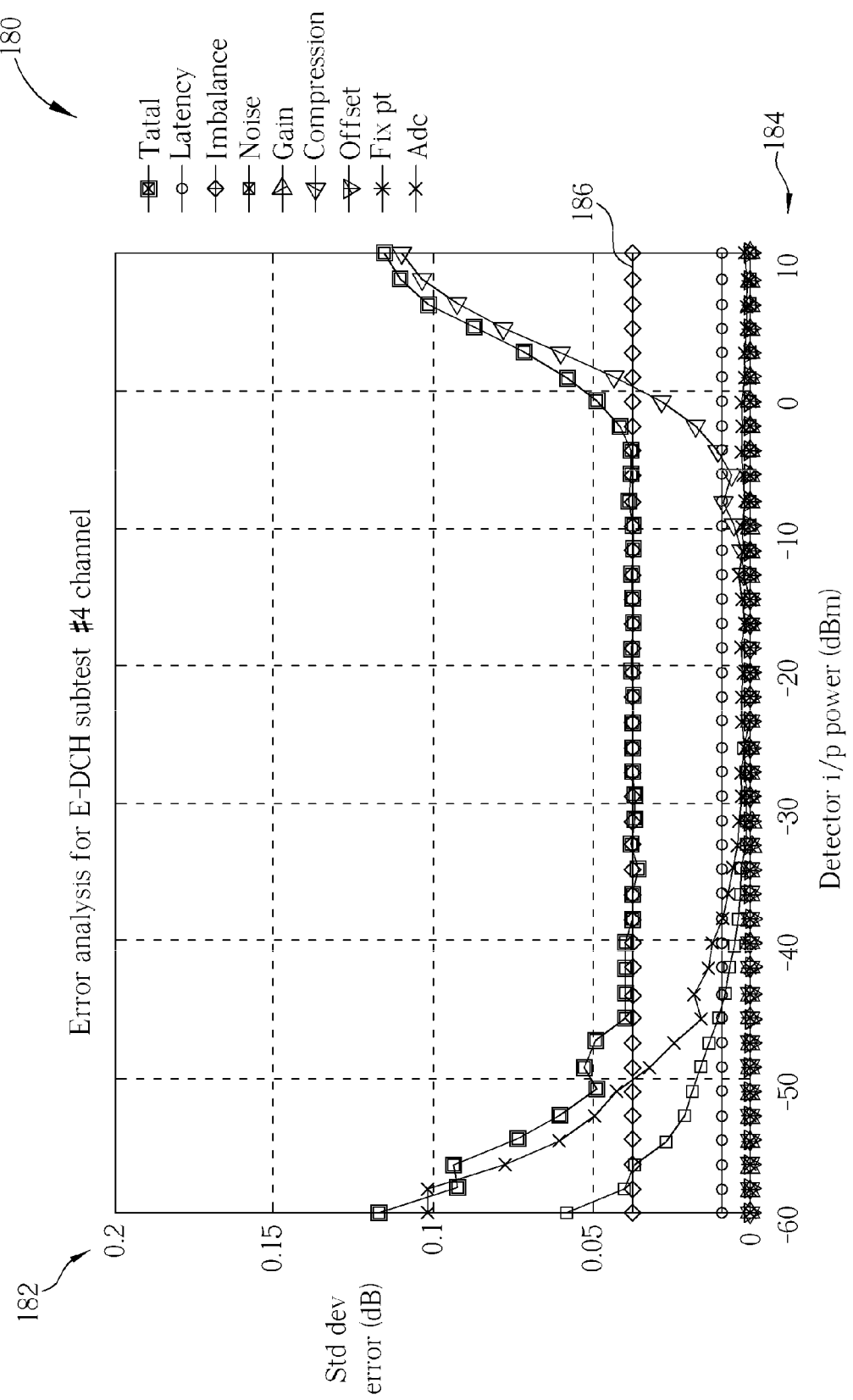
FIG. 1C shows a plot of standard deviation versus detector power.

A skilled artisan will recognise that the example embodiment in FIG. 3 may be implemented by inserting reference (transmit) correction function/module 352 along reference path of FIG. 1 and by inserting detector quadrature error correction function 354 between the ACI filter 150 and the gain estimation algorithm 155 of FIG. 1.

The partitioning of the blocks in FIG. 3 within the circuits or ICs may be predominantly a design choice. In one example, the transmit power control system architecture 300 may comprise a portion of feedback circuitry 240 of FIG. 2. In other examples, the transmit power control system architecture 300, or a portion thereof, may comprise a portion of the transmitter/modulation circuitry 222 and/or signal processing module 208 of FIG. 2.

A skilled artisan will appreciate that in other applications and implementations, alternative functions or modules or circuits or devices and/or other techniques may be applied within the general concept described herein. For example, in other implementations of the enhanced example, the detector quadrature error determination and correction functions and the reference (transmit) quadrature error determination and correction functions may be translated and, thus, any phase rotation or phase offset introduced into the reference (transmit)-detector path between the reference (transmit) quadrature error determination function/module 306 and the detector quadrature error determination function/module 310 may be taken into account separately in the reference (transmit) quadrature error correction function/module 352.

Referring now to FIG. 4, a more detailed representation 400 of an enhanced quadrature error detection and correction arrangement is illustrated, in accordance with the enhanced example embodiment of the invention. The more detailed representation 400 includes an additional and separate quadrature error correction and detection arrangement, which, in one example, utilises the same principle as employed in a transmit path quadrature error correction function (or module) that corrects for the intentional quadrature imbalance introduced into the detection path. Thus, in one example embodiment, the same architecture may be employed in both a transmit quadrature error detection and correction function (or module) as well as an additional and separate quadrature error detection and correction function (or module) to correct for quadrature errors along the detector path, at minimal additional hardware cost. The example in FIG. 4 provides for additional detector quadrature (I/Q) calibration support plus, in one example, one or more software algorithm(s) to separately determine any detector path quadrature imbalance.

First, a transmit quadrature (I/Q) calibration routine is performed, as illustrated by calibration logic 450, which produces at least one transmit path amplitude error $\epsilon_{TX}$ value and at least one transmit path phase error $\theta_{TX}$ value. These transmit path amplitude error and phase error values are then written to a transmit quadrature (I/Q) and reference correction function (which may be implemented in software, hardware or firmware in gain register 432 and/or phase register 436 or indeed reference (transmit) correction function/module 352 of FIG. 3). A detector quadrature (I/Q) calibration routine is also performed, as illustrated by calibration logic 450, which produces at least one detector path amplitude error $\epsilon_{DX}$ value and at least one detector path phase error $\theta_{DX}$ value. These detector path amplitude error and phase error values are then written to a detector quadrature (I/Q) and correction function (which may be implemented in software, hardware or firmware in gain register 412 and/or phase register 416, or indeed detector quadrature error correction function/module 354 of FIG. 3).

The more detailed representation 400 of the quadrature error detection and correction arrangement comprises the detector quadrature (I/Q) signals 402 and the transmit path (reference) quadrature (I/Q) signals 404 being input to combining logic 406, for example in a form of an analogue multiplexer. The combined quadrature signals are each input to analogue-to-digital converter (ADC) 408 and thus converted into a digital form. The digital representation of the detector quadrature (I/Q) signals and the transmit path (reference) quadrature (I/Q) signals are low pass filtered in ACI filters 411 and respectively input into detector quadrature balancing logic 410 and transmit reference quadrature balancing logic 430.

In this example, the detector quadrature balancing logic 410 comprises a gain register 412 that is used to provide a gain error correction parameter $\epsilon_{DX}$ for the detector quadrature error, which is subsequently subtracted from (in this example) a logic '1' to create the mathematical array as illustrated generally at point 414, which is applied to the low pass filtered digital representation of the detector quadrature (I/Q) signals.

In this manner, gain-adjusted low pass filtered digital representations of the detector quadrature (I/Q) signals are created. The detector quadrature balancing logic 410 further comprises a phase register 416 that is used to provide a phase error correction parameter $\theta_{DX}$, for the detector quadrature error. This phase error correction parameter $\theta_{DX}$ is applied to the gain-adjusted, low pass filtered digital representations of the detector quadrature (I/Q) signals as illustrated in FIG. 4. In this manner, an error-corrected low pass filtered digital representation 420 of the detector quadrature (I/Q) signals is created and applied to gain estimation algorithm 356.

Similarly, in this example, the transmit reference quadrature balancing logic 430 comprises a gain register 432 that is used to provide a gain error correction parameter $\epsilon_{TX}$ for the transmit (reference) quadrature error, which is subsequently summed with (in this example) a logic '1' to create the mathematical array as illustrated generally at point 434, which is applied to the low pass filtered digital representation of the transmit (reference) quadrature (I/Q) signals. In this manner, gain-adjusted low pass filtered digital representation of the transmit (reference) quadrature (I/Q) signals are created. The transmit reference quadrature balancing logic 430 further comprises a phase register 436 that is used to provide a phase error correction parameter $\theta_{TX}$, for the transmit (reference) quadrature error. This phase error correction parameter $\theta_{TX}$ is applied to the gain-adjusted, low pass filtered digital representations of the transmit (reference) quadrature (I/Q) signals as illustrated in FIG. 4. In this manner, an error-corrected low pass filtered digital representations of the transmit (reference) quadrature (I/Q) signals is also created and applied to gain estimation algorithm 356.

In one aspect, the example illustrated in FIG. 4 may be considered as an equivalent preferred embodiment to the example of FIG. 3, where the mathematical steps are replaced by a practical approximation. In this manner, the mathematical arrays indicated at 414 and 418 may be considered as a preferred or practical embodiment of reference (transmit) quadrature error function/module 306.

Figure 5A:
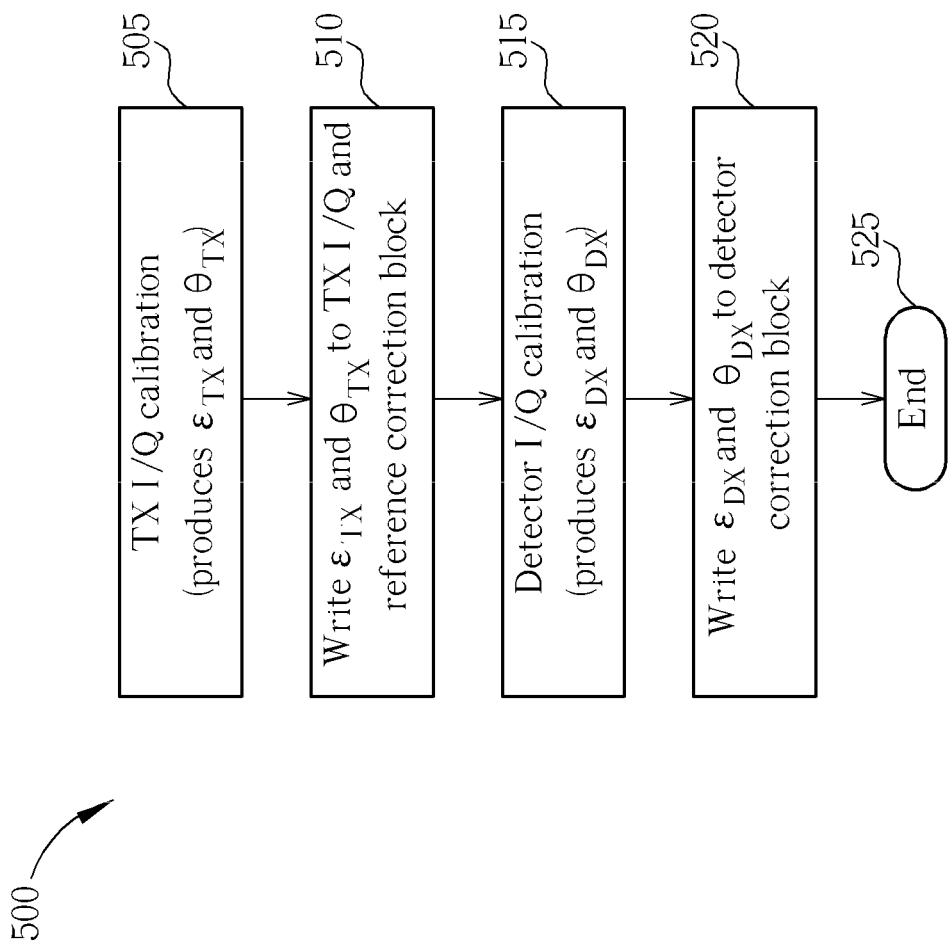
FIG. 5A illustrates an example flowchart of the transmit power control system architecture in accordance with an enhanced example embodiment of the invention.

Referring now to FIG. 5A, an example flowchart 500 employed in the transmit power control system architecture of FIG. 3 and FIG. 4 is illustrated in accordance with the enhanced example embodiment of the invention.

Flowchart 500 employs an estimation process that may be completed on power up, in order to estimate both the transmit quadrature imbalance and detector quadrature imbalance (of gain and phase values). In other example embodiments, the estimation process may be performed at times other than power up, for example uplink (UL) start, compression or discontinuous transmission (DTX) gaps, etc. First, as shown in step 505, a transmit quadrature (I/Q) calibration routine is performed, as illustrated by calibration logic 450 of FIG. 4, which produces at least one transmit path amplitude error $\epsilon_{TX}$ value and at least one transmit path phase error $\theta_{TX}$ value. These transmit path amplitude error and phase error values are then written to a transmit quadrature (I/Q) and reference correction function (which may be implemented in software, hardware or firmware in gain register 432 and/or phase register 436 of FIG. 4 or reference (transmit) correction function/module 352 of FIG. 3), as shown in step 510. A detector quadrature (I/Q) calibration routine is also performed, as illustrated by calibration logic 450 of FIG. 4, which produces at least one detector path amplitude error $\epsilon_{DX}$ value and at least one detector path phase error $\theta_{DX}$ value, as shown in step 515. These detector path amplitude error and phase error values are then written to a detector correction function (which may be implemented in software, hardware or firmware in gain register 412 and/or phase register 416 of FIG. 4 or detector correction function/module 354 of FIG. 3), as shown in step 520. The estimation process then ends at step 525.

Figure 5B:
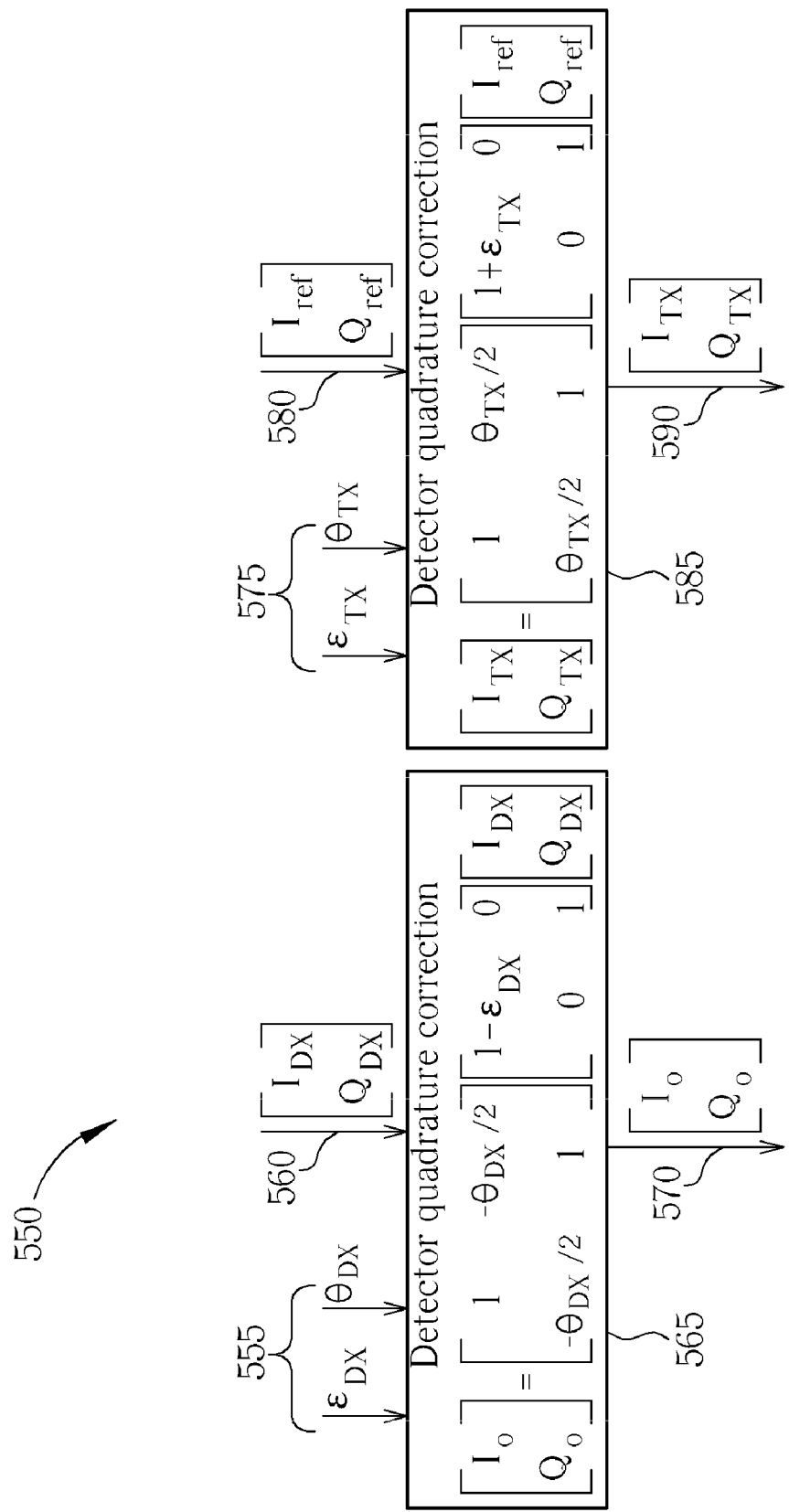
FIG. 5B illustrates an example flowchart for performing a calibration process routine during operation of a power detection algorithm.

FIG. 5B illustrates an example flowchart 550 for performing a calibration process routine during operation of a power detection algorithm. In accordance with example embodiments of the invention, two distinct calibration and correction routines are performed, one for each of the detector path and the transmit reference path. In one example embodiment, both calibration and correction routines are run concurrently, with both calibration routines consisting of a respective linear transformation 565, 585. For both calibration and correction routines, the complex baseband 'I' and 'Q' values 560, 580, together with the respective determined detector path amplitude error $\epsilon_{DX}$ and detector path phase error $\theta_{DX}$ 555 and determined transmit path amplitude error $\epsilon_{TX}$ and transmit path phase error $\theta_{TX}$ 575 are linearly transformed to produce the calibrated or corrected 'I' and 'Q' outputs for the detector path 570 and the reference transmit path 590.

In some examples, some or all of the steps illustrated in the flowchart may be implemented in hardware and/or some or all of the steps illustrated in the flowchart may be implemented in software.

Although some aspects of the invention have been described with reference to their applicability to a UMTS™ (Universal Mobile Telecommunication System) cellular communication system, and in particular to a UMTS™ Terrestrial Radio Access Network (UTRAN) of a 3$^{rd}$ generation partnership project (3GPP™) system, it will be appreciated that the invention is not limited to this particular cellular communication system. It is envisaged that the concept described above may be applied to any other cellular communication system or indeed applied to any wireless communication unit requiring a form of transmit power control, for example in a form of a power control loop that employs a quadrature based detector.

In particular, it is envisaged that the aforementioned inventive concept can be applied by a semiconductor manufacturer to any integrated circuit comprising a power control loop that employs a quadrature based detector. It is further envisaged that, for example, a semiconductor manufacturer may employ the inventive concept in a design of a stand-alone device, such as a radio frequency IC that comprises baseband processing and functionality, or an application-specific integrated circuit (ASIC) and/or any other sub-system element. Furthermore, in some examples, the inventive concept may be applied in discrete component/circuit form.

Figure 6:
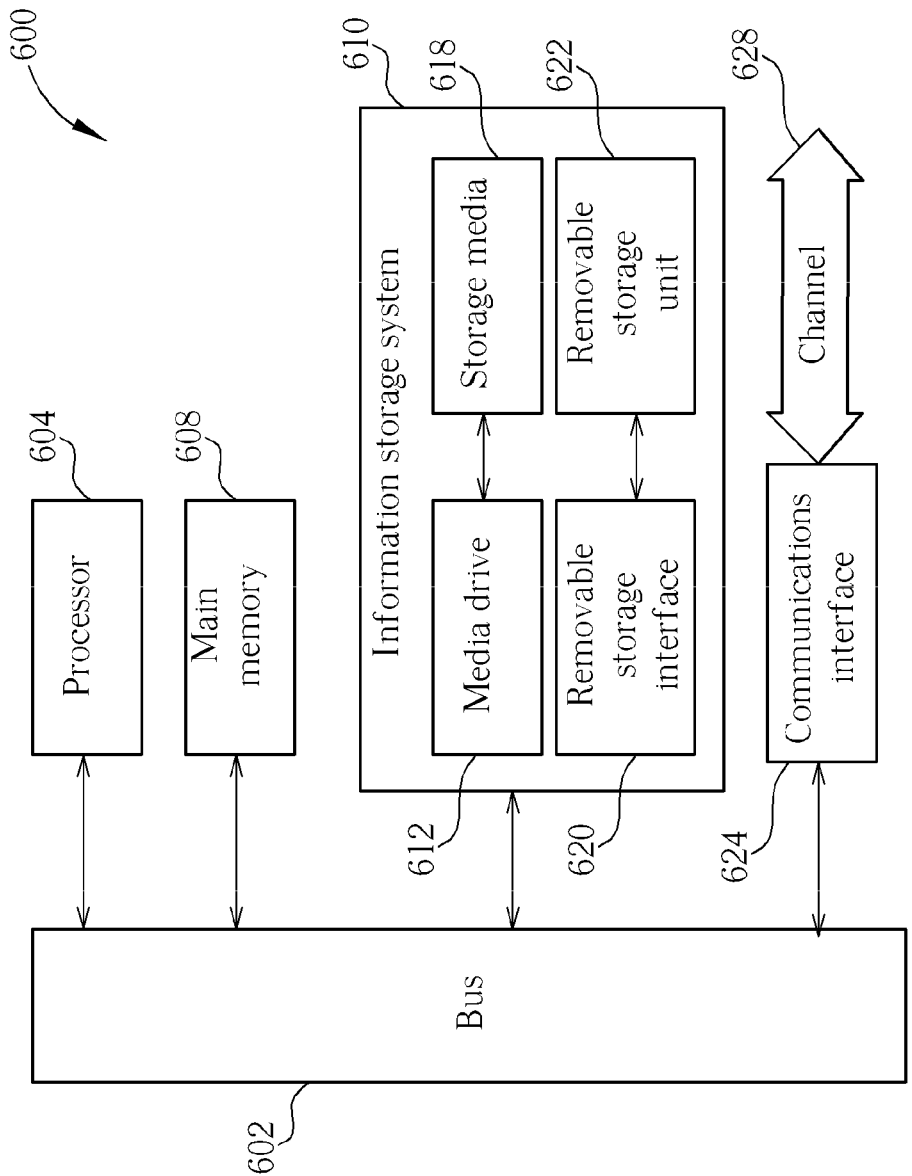
FIG. 6 illustrates a typical computing system that may be employed to implement signal processing functionality in embodiments of the invention.

Referring now to FIG. 6, there is illustrated a typical computing system 600 that may be employed to implement signal processing functionality in embodiments of the invention. Computing systems of this type may be used in access points and wireless communication units. Those skilled in the relevant art will also recognize how to implement the invention using other computer systems or architectures. Computing system 600 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special-purpose processing engine such as, for example, a microprocessor, microcontroller or other control module. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having particular computer software or data stored therein.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, main memory 608, storage media 618, or removable storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 622, media drive 612 or communications interface 624. The control module (in this example, software instructions or computer program code), when executed by the processor 604, causes the processor 604 to perform the functions of the invention as described herein.

Thus, the hereinbefore examples provide an integrated circuit and a wireless communication unit comprising a transmit power control system that employs a quadrature (I/Q) based power detector for correcting quadrature imbalance between a reference path and a detector path. The hereinbefore examples also provide a method and non-transitory computer program product for a transmit power control system.

It will be appreciated that, for clarity purposes, the above description has described embodiments of the invention with reference to different functional units, modules, logic elements and/or processors. However, it will be apparent that any suitable distribution of functionality between different functional units or processors, for example with respect to an integrated circuit comprising a transmit power control system that employs a quadrature (I/Q) based power detector for correcting quadrature imbalance between at least one reference path and at least one detector path, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, and as previously mentioned, for the illustrated examples, the integrated circuits 300 comprising a transmit power control system architecture have been illustrated and described as comprising the logical components or modules or software/firmware/hardware components as shown. However, it is contemplated that integrated circuits 300 adapted in accordance with the present invention may equally be implemented with fewer components with inputs/outputs provided to components external to the integrated circuit(s) as an equivalent architecture design. Furthermore, in some example embodiments, the logical components or modules or software/firmware/hardware components may be implemented in a generally discrete, stand alone function element, or integrated within an alternative functional module, and may not reside within an integrated form such as the integrated circuits 300.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved integrated circuit comprising a quadrature power detector and method for quadrature power detection have been described, wherein the aforementioned disadvantages with prior art arrangements have been substantially alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit for a wireless communication unit comprising a transmit power control system that employs a quadrature (I/Q) based power detector having at least one reference path and at least one detector path, wherein the integrated circuit comprises:
    a first quadrature error determination module for determining a quadrature error of a transmit signal;
    a second quadrature error determination module for determining a quadrature error of a detector signal input to the at least one detector path;
    a first quadrature balancing module operably coupled to the first quadrature error determination module and arranged to correct for quadrature error of the transmit signal and output a reference signal to the at least one reference path;
    a second quadrature balancing module operably coupled to the first quadrature error determination module and arranged to correct for quadrature error of the reference signal input to the at least one reference path; and
    a third quadrature balancing module operably coupled to the second quadrature error determination module and arranged to correct for quadrature error of the detector signal input from the at least one detector path.

2. The integrated circuit of claim 1 wherein the integrated circuit comprises a power detector comprising, or operably coupled to the first quadrature error determination module and the second quadrature error determination module, and arranged to calibrate transmitter quadrature errors of the wireless communication unit.

3. The integrated circuit of claim 1 wherein the second quadrature balancing module is located in the at least one reference path and located separate from the third quadrature balancing module located in the at least one detector path.

4. The integrated circuit of claim 1 wherein at least one from a group consisting of:
    a phase error of the transmit signal input to the at least one reference path;
    a phase error of the detector signal input to the at least one detector path is random and the second quadrature balancing module and the third quadrature balancing module comprise independent correction modules.

5. The integrated circuit of claim 1 wherein at least one from a group consisting of: the second quadrature balancing module and the third quadrature balancing module is arranged to correct for a phase rotation between the at least one reference path and the at least one detector path.

6. The integrated circuit of claim 1 wherein the third quadrature balancing module comprises a gain register arranged to provide a gain error correction parameter for generating a detector quadrature correction value.

7. The integrated circuit of claim 1 wherein a phase error of the signal between the at least one reference path and the at least one detector path is at least one from a group consisting of: zero, known, deterministic.

8. The integrated circuit of claim 7 wherein the second quadrature balancing module and the third quadrature balancing module comprise a combined quadrature balancing module arranged to provide a combined quadrature balanced signal to a gain estimation module.

9. The integrated circuit of claim 1 wherein the integrated circuit comprises a tone generator for generating a tone to input to a power amplifier to facilitate quadrature calibration.

10. The integrated circuit of claim 9 further comprising a feedback circuit that comprises the first quadrature error determination module and the transmit signal is an amplified representation of the tone received from the power amplifier via the at least one reference path.

11. The integrated circuit of claim 9 wherein the feedback circuit comprises the second quadrature error determination module coupled to at least one detector feedback path such that the second quadrature error determination module receives a representation of the tone from the tone generator via the at least one detector feedback path.

12. The integrated circuit of claim 11 further comprising a calibration and correction module arranged to perform a calculation of correction or calibration coefficients to correct for at least one of quadrature error of the reference signal input to the at least one reference path and quadrature error of the detector signal input from the at least one detector path.

13. A wireless communication unit comprising a transmit power control system that employs a quadrature (I/Q) based power detector having at least one reference path and at least one detector path, wherein the wireless communication unit comprises:
    a first quadrature error determination module for determining a quadrature error of a transmit signal;
    a second quadrature error determination module for determining a quadrature error of a detector signal input to the at least one detector path;
    a first quadrature balancing module operably coupled to the first quadrature error determination module and arranged to correct for quadrature error of the transmit signal and output a reference signal to the at least one reference path;
    a second quadrature balancing module operably coupled to the first quadrature error determination module and arranged to correct for quadrature error of the reference signal input to the at least one reference path; and
    a third quadrature balancing module operably coupled to the second quadrature error determination module and arranged to correct for quadrature error of the detector signal input from the at least one detector path.

14. A method for a transmit power control system that employs a quadrature (I/Q) based power detector having at least one reference path and at least one detector path, the method comprising:
    determining a quadrature error of a transmit signal;
    quadrature balancing the transmit signal;
    outputting a reference signal to the at least one reference path;

quadrature balancing the reference signal input to the at least one reference path;

determining a quadrature error of a detector signal input to the at least one detector path; and quadrature balancing the detector signal input from the at least one detector path.

15. A non-transitory computer program product comprising executable code stored therein for a transmit power control system that employs a quadrature (I/Q) based power detector having at least one reference path and at least one detector path, the executable code operable for performing the method of claim 14.

* * * * *